Feb. 17, 1970   A. E. ECKERMANN   3,496,367
LIGHT SENSING DEVICE INCLUDING MEANS FOR SENSING
WIDE ANGLE AND FINE ANGLE LIGHT
Filed April 12, 1965   3 Sheets-Sheet 1

INVENTOR.
ALFRED E. ECKERMANN
BY
Constantine A. Michalos
ATTORNEY

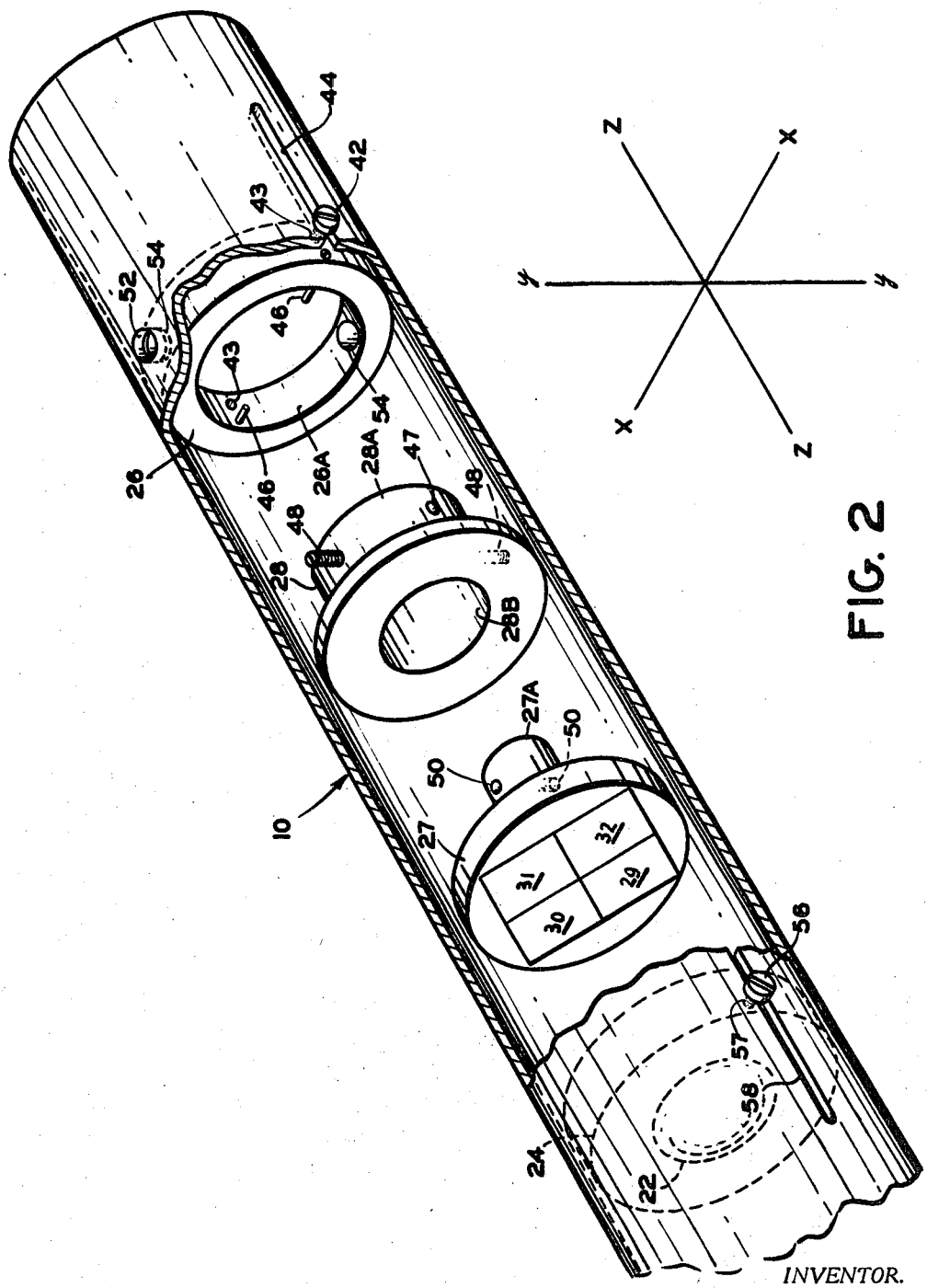

INVENTOR.
ALFRED E. ECKERMANN
BY
Constantine A. Michalos
ATTORNEY

United States Patent Office 3,496,367
Patented Feb. 17, 1970

3,496,367
LIGHT SENSING DEVICE INCLUDING MEANS FOR SENSING WIDE ANGLE AND FINE ANGLE LIGHT
Alfred E. Eckermann, Littleton, Colo., assignor to The Bendix Corporation, Teterboro, N.J., a corporation of Delaware
Filed Apr. 12, 1965, Ser. No. 447,265
Int. Cl. G01j 1/20
U.S. Cl. 250—203                              10 Claims

ABSTRACT OF THE DISCLOSURE

A light sensing device including first and second light sensitive elements. A lens is mounted ahead of both of said light sensitive elements for focusing light on the first light sensitive elements when the light is above a predetermined small angle of incidence and for focusing light on the second light sensitive elements when the light is within the perdetermined small angle of incidence. The first and second light sensitive elements are connected for providing electrical outputs corresponding to the angle of incidence of the light.

---

This invention is related to light sensing devices and particularly to light sensing devices for controlling the attitude of an object relative to the sun or other light source.

The means embodied in the present invention combines a fine angle sensing concept with a relatively wide angle sensing concept in a unique manner so as to eliminate the loss of energy from an incident light beam as the light progresses from the wide angle sensing stage to the fine angle sensing stage. Since no light energy is lost, a smooth transfer of light is accomplished and a contiuous electrical output is generated by the light in cooperation with the means embodied in the present invention. This output may be used to actuate controlling devices which in turn may be used to guide an object such as a space vehicle on its proper path.

Heretofore, most inertial guidance systems which employ light sensing devices as part of their instrumentation, have used separate and various such devices to accomplish a required task. In a guidance system, for example, several wide angle sensors, a fine angle sensor, and various special sensors may be employed. Each of these aforenoted sensors consumes space which is extremely valuable in inertial guidance packaging and, in addition, complicated electrical interconnections are required to couple the various sensors in order that the overall system properly perform its intended function.

The means embodied in the present invention, however, accomplishes the task previously requiring several light sensors by combining a wide angle and fine angle light sensor in a single integrated device which yields a continuous wide angle to fine angle output characteristic derived from a single incident light beam, without experiencing an energy loss. Moreover, the device embodied in the present invention is of a compact size so as to cause a reduction of weight and a saving of space, which is valuable in an inertial guidance system. Also, since the device integrates a wide angle sensor with a fine angle sensor, the complexity of the circuitry required to determine the electrical output of such an integrated device is greatly reduced.

Therefore, it is an object of this invention to provide an improved means to sense and indicate the direction of a light source.

It is another object of this invention to provide light sensing means combining a fine angle sensing portion and wide angle sensing portion in a manner so as to eliminate any lose of energy from an incident light beam as it progresses from the wide angle to the fine angle sensing stage.

It is another object of this invention to provide in a single integral device, wide angle and fine angle sensing means which will yield a continuous output characteristic derived from a single incident light beam without any loss in energy.

It is another object of this invention to provide in reduced space and without complicated electrical interconnections, a wide angle to fine angle light sensing device.

It is another object of this invention to provide a wide angle to fine angle light sensing device having an electrical output which may be used to control the attitude of an object such as a space vehicle.

It is another object of this invention to provide a light sensing device which permits a light source to illuminate a series of photovoltaic cells in such a manner that the photovoltaic cells will produce an electrical output having a relation to the direction of the light source relative to the axis of the sensing device.

It is another object of this invention to provide a light sensing device to convert light signals from a light source into control signals corresponding to the attitude of the light sensing device relative to the light source.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 2 is an isometric representation of several of the components embodied in the present invention, showing these components in exploded arrangement to each other within a fragmentary portion of a casing.

Figure 1:
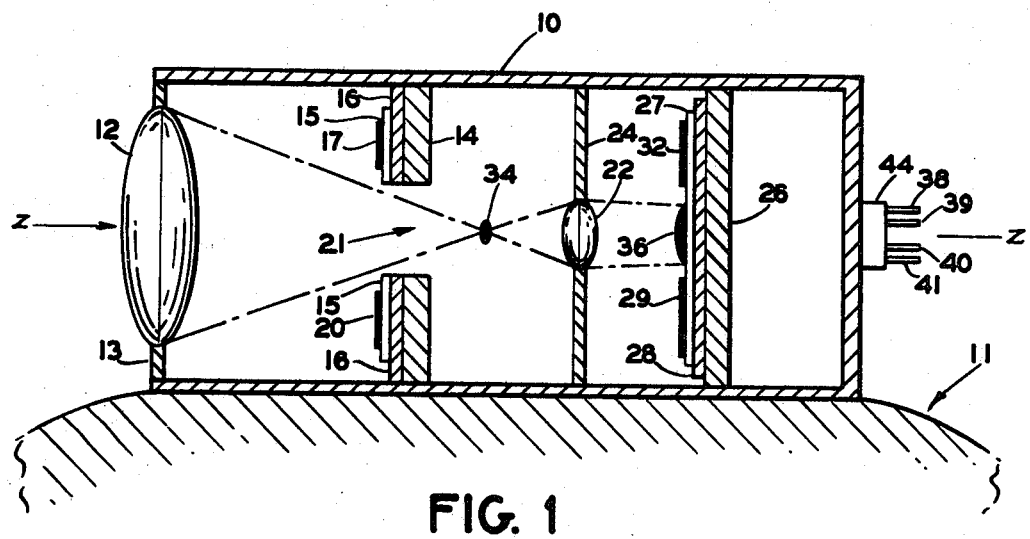
FIGURE 1 is a side view, diagrammatic representation of the light sensing device of the present invention.

Referring now to the drawings, and more particularly to FIGURE 1, there is shown a light sensing device of the type embodied in the present invention having a casing 10 which may be fixed to a space vehicle 11 in which the light sensing device is mounted. An objective lens 12 is secured at the front of the casing 10, as viewed in FIGURE 1, by a suitable bezel 13, with light from the sun or some other similar light source entering the sensing device through the lens 12. The lens 12 may be a simple, single element lens.

Figure 3:
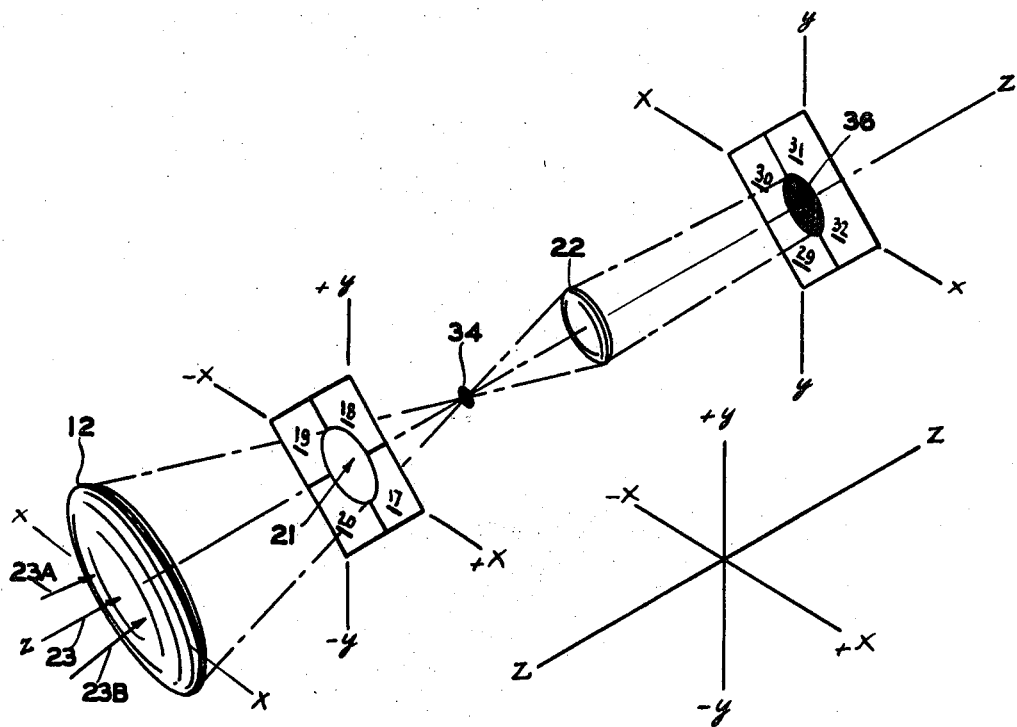
FIGURE 3 is an isometric, diagrammatic representation, showing the various components of the present invention in operable relation to each other.

A front gimbal 14 is mounted in back of the objective lens 12, viewing the sensing device as shown in FIGURE 1, so as to be longitudinally adjustable relative to the casing 10 for reasons as will be shown with reference to FIGURE 2. The front gimbal 14 has mounted thereon a front plate 16. The front plate 16 has assembled thereto a disc 15. Four photovoltaic cells 17, 18, 19, 20, as best shown in FIGURE 3, of equal area and of a material such as silicon, or a similar material which generates a voltage or current when exposed to light, are secured to the disc 15. The cells 17 and 20 are shown in FIGURE 1 with the arrangement of the four cells 17, 18, 19, 20 being shown in FIGURE 3. Each of the four photovoltaic cels 17, 18, 19, 20 are ellectrically insulated from each other. The front plate 16 and the disc 15 are mounted to the front gimbal 14 so as to be adjustable in two mutually perpendicular directions relative thereto, as will be shown with reference to FIGURE 2. The assemby of the front gimbal 14, the front plate 16 and the disc 15 containing the photovoltaic cells 17, 18, 19, 20 has an aperture 21 through its center, with the aperture 21 having a diameter depending on the size of the objective lens 12. The purpose of the aperture 21 is to prevent the illumination of the cells 17, 18, 19, 20 under conditions of fine angle sensing as will be hereinafter explained.

A magnifying lens 22, which may also be a single element simple lens, is mounted in back of the front gimbal 4, viewing the sensing device as shown in FIGURE 1, by a suitable bezel 24. The bezel 24 is mounted so as to be longitudinally adjustable relative to the casing 10, as will be shown with reference to FIGURE 2.

A rear gimbal 26 is mounted in back of the magnifying lens 22, viewing the sensing device as shown in FIGURE 1, so as to be longitudinally adjustable relative to the casing 10 as shown in FIGURE 2. The rear gimbal 26 has mounted thereon a rear plate 28. The rear plate 28 has assembled thereto a disc 27. Four photovoltaic cells 29, 30, 31, 32 of equal area, and of a material such as silicon, or a similar material which generates a voltage or current when exposed to light, are secured to the disc 27. The cells 29 and 32 are shown in FIGURE 1 with the arrangement of the four cells 29, 30, 31, 32 being shown in FIGURES 2 and 3. Each of the four photovoltaic cells 29, 30, 31, 32 are electrically insulated from each other. The rear plate 28 and the disc 27 are mounted to the rear gimbal 26 so as to be adjustable in two mutually perpendicular directions relative thereto as will be shown with reference to FIGURE 2.

In the basic operation of the light sensing device, light from the sun or some other similar light source may enter the sensing device through the object lens 12. If the attitude of the light source is coincident with the longituidnal axis Z—Z of the sensing device as shown in FIGURE 1, the light will pass through the objective lens 12 and through the aperture 21 in the front gimbal 14, the front plate 16 and the disc 15 containing the photovoltaic cells 17, 18, 19, 20, without illuminating any of these cells. An image 34 will be formed at the focal point of the objective lens 12. The image 34 will be the object for the magnifying lens 22, which in turn will produce an enlarged image 36 on the assembly including the rear gimbal 26, the rear plate 28 and the disc 27 containing the photovoltaic cells 29, 30, 31, 32, thus equally illuminating each of the cells in this group.

For fine angle deviations of the light source from the axis Z—Z of the sensing device, the light will continue to pass through the aperture 21, thus illuminating only the photovoltaic cells 29, 30, 31, 32. As this angle of deviation becomes wider, however, the light will be intercepted by the photovoltaic cells 17, 18, 19, 20, causing illumination of these cells as well as illumination of the photovoltaic cells 29, 30, 31, 32. The illumination of the photovoltaic cells 17, 18, 19, 20 and of the photovoltaic cells 29, 30, 31, 32 in this manner, produces electrical outputs at pins 38, 39, 40, 41 of connector 44 which correspond to the attitude of the sensing device relative to the light source, and hence to the attitude of the space vehicle 11 in which the sensing device is mounted. These outputs may be utilized through the circuitry shown in FIGURE 4 to control the attitude of the space vehicle 11 relative to the light source, or may be used as computer data to determine various navigational parameters.

As heretofore noted, several components included in the light sensor embodied in the present invention are adjustably mounted relative to the casing 10. Such adjustable mounting is necessary to provide for proper calibration and setting of the sensor so that when the attitude of the light source is coincident to the axis Z—Z of the sensor, the light will pass through the aperture 21 and provide equal illumination of the photovoltaic cells 29, 30, 31, 32. Under this condition, a null output will be provided through the circuitry of FIGURE 4. Outputs which deviate from this null output correspond to a deviation in the attitude of the light source from the axis Z—Z of the sensor.

In reference then to FIGURE 2, the various adjustably mounted components included in the light sensor are shown in relation to the casing 10. The means of adjustably mounting these components to the casing 10 is shown for one assembly including the gimbal 26, the plate 28, and the disc 27. The assembly including the gimbal 14, the plate 16, and the disc 15, is adjustably mounted to the casing 10 in a similar manner. Also, the means for adjustably mounting the bezel 24 with the lens 22 to the casing 10 is herein shown.

The gimbal 26 is mounted in the casing 10 so as to be slidable longitudinally along the axis Z—Z of the sensor as shown in FIGURE 2. When the desired position is obtained of the gimbal 26 along the axis Z—Z the gimbal 26 may be secured in this position by tightening screws 42 against slots 44 in the casing 10, with the screws 42 extending, along the X—X axis, into tapped holes 43 in the gimbal 26.

With the gimbal 26 so positioned along the longitudinal axis Z—Z of the sensor, the plate 28 may be positioned relative to the gimbal 26. The plate 28 has an outside diameter 28A which fits loosely into an inside diameter 26A of the gimbal 26. Screws 46, which extend through the gimbal 26 parallel to the X—X axis, may be tightened against recesses 47 on the outside diameter 28A of the plate 28. Adjustment of the plate 28 relative to the gimbal 26 along the X—X axis may be accomplished by loosening one and tightening the other of the screws 46 until the desired position of the plate 28 along the X—X axis is obtained. Access to the screws 46 may be obtained through the slots 44 in the casing 10 shown in FIGURE 2.

The disc 27 having the photovoltaic cells 29, 30, 31, 32 secured thereto may be positioned relative to the plate 28 and the gimbal 26 by inserting the outside diameter 27A of the disc 27 into the inside diameter 28B of the plate 28. The outside diameter 27A fits loosely in the inside diameter 28B and may be secured in position by tightening screws 48, which extend, parallel to the Y—Y axis, through the outside diameter 28A of the plate 28, into recesses 50 on the outside diameter 27A of the disc 27. Adjustment of the disc 27 along the Y—Y axis, as shown in FIGURE 2, and thereby the adjustment along the Y—Y axis of the photovoltaic cells 29, 30, 31, 32 may be accomplished by loosening one and tightening the other of the screws 48 against the recesses 50 on the outside diameter 27A of the disc 27. Access to the screws 48 may be had through holes 52 in the casing 10 and holes 54 in the gimbal 26.

With the components including the gimbal 26, the plate 28, and the disc 27 assembled in this manner, it may be seen that the photovoltaic cells 29, 30, 31, 32 may be adjustable along three mutually perpendicular axes; the axis X—X, X—Y, and Z—Z. Such an adjustment is necessary to provide for proper calibration of the light sensing device, as will be hereinafter explained. The assembly including the gimbal 14, the plate 16, and the disc 15, containing the photovoltaic cells 17, 18, 19, 20 may be adjustably mounted relative to the casing 10 in the manner as heretofore described.

The bezel 24 with the lens 22 mounted therein may be also adjustably positioned in the casing 10 with adjustment provided along the Z—Z axis only, as shown in FIGURE 2. The bezel 24 is mounted to the casing 10 so as to be slidable longitudinally along the Z—Z axis of the sensing device. When the proper position of the bezel 24 along the Z—Z axis has been obtained, the bezel 24 may be locked into this position by tightening screws 56 against slots 58 of the casing 10. The screws 56 extend, parallel to the axis X—X, into tapped holes 57 included in the bezel 24. The adjustment along the Z—Z axis of the bezel 24 with the lens 22 is also necessary for proper calibration of the device as will be next explained.

The adjustable mounting of the components as indicated in FIGURE 2 provides for the initial calibration of the sensing device. In reference to FIGURE 3 the light from the sun or some other such source may enter the sensing device through the lens 12 along the axis Z—Z. Under this condition, the assembly containing the photovoltaic cells 29, 30, 31, 32 may be adjusted along the X—X, Y—Y, and Z—Z axes, as indicated in FIGURE 2 and the description thereof, so that the cells 29, 30, 31, 32 are equally illuminated by the light from the image 36 and a null output is generated by the circuitry of FIGURE 4. The assembly containing photovoltaic cells 17, 18, 19, 20 may be simultaneously adjusted along the X—X, Y—Y, and Z—Z axes so that the light will pass directly through the aperture 21 as shown in FIGURE 1 and FIGURE 2, with the cells 17, 18, 19, 20 thus receiving no illumination and producing no current in the circuitry of FIGURE 4 when the attitude of the light source is coincident with the Z—Z axis of the light sensor.

Figure 4:
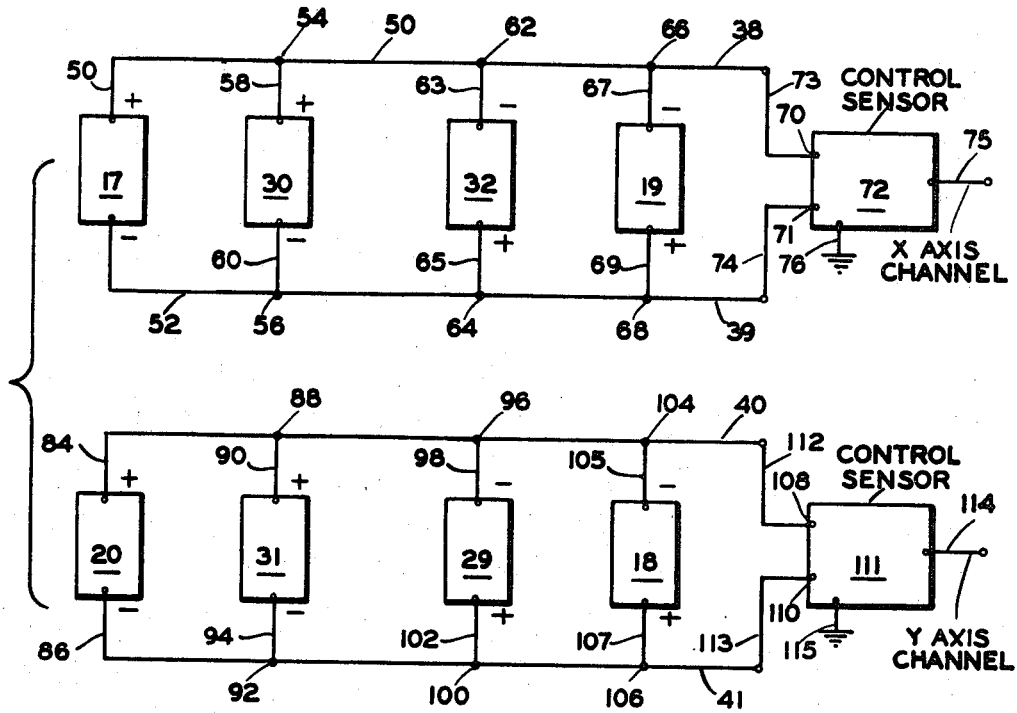
FIGURE 4 is a schematic wiring diagram showing the circuitry interconnecting the various photovoltaic cells embodied in the present invention to provide a system for controling the attitude of a space vehicle.

With the sensing device so calibrated, an angular deviation of the light source from the Z—Z axis will cause the light image 36 to be displaced along the X—X axis or the Y—Y axis, depending on the direction of said deviation, thus causing unequal illumination of the cells 29, 30, 31, 32, and hence an output will be generated by the circuitry as shown in FIGURE 4. When this angular deviation is very small, in the nature of severa arc seconds for example, the photovoltaic cells 17, 18, 19, 20 will still not be illuminated by the light entering the sensing device through the lens 12, since the light will continue to pass through the aperture 21 of the assembly containing the cells 17, 18, 19, 20.

When the light beam deviates from the axis Z—Z by an angle in the nature of several arc minutes, for example, the light transmitted through the lens 12 will begin to extend beyond the limits of the aperture 21 and illuminate the cells 17, 18, 19, 20. Initially, all of the energy of the light was concentrated on the photovoltaic cells 29, 30, 31, 32. As the angular deviation of the light source from the axis Z—Z increases, more and more of the light will be intercepted by the cells 17, 18, 19, 20 before it reaches the cells 29, 30, 31, 32 through the magnifying lens 22. For relatively wide angles, ranging from about ten arc minutes to the maximum scope of the sensor which may be in the nature of 10 degrees, all of the light will be intercepted by the cells 17, 18, 19, 20. Because of the electrical interconnection of both groups of cells, as indicated in FIGURE 4, all of the energy of the light source is thus preserved, with both groups of cells contributing to the output generated by the circuitry of FIGURE 4. The nature of this output relative to the angular deviation of the light source will be hereinafter discussed with reference to FIGURE 5.

With reference to FIGURE 3 and FIGURE 4, the detailed operation of the light sensing device embodied in the present invention may next be described. If the light enters the sensing device through the lens 12, shown by arrow 23 in FIGURE 3, exactly coincident with the longitudinal axis Z—Z, the light will pass through the aperture 21 of the photovoltaic cell assembly including the cells 17, 18, 19, 20 and illuminate, through the magnifying lens 22, equal areas of the cells 30 and 32 and the cells 29 and 31. In reference to FIGURE 4, the output across pins 38 and 39 and 40 and 41, also shown on the connector 44 in FIGURE 1, will be zero, since the device has been calibrated to provide a null upon such equal illumination of the cells 29, 30, 31, 32 as heretofore noted.

When the light source deviates from the axis Z—Z in a positive direction along the axis X—X, as viewed in FIGURE 3 for example, the light will move toward cell 32 of the cell group including the cells 29, 30, 31, 32. The cell 32, receiving more illumination, thus begins to increase its positive output, while the cell 30 of the cell group including cells 29, 30, 31, 32 simultaneously decreases its positive output because it is now receiving less illumination. The result is manifested in FIGURE 4, wherein pin 39 becomes more positive and pin 38 becomes less positive. Thus, a polarized signal has been generated in the X-axis channel shown in FIGURE 4.

For small angular deviations, in the nature of several arc seconds, of the light source from the axis Z—Z in a positive direction along the X-axis, as shown in FIGURE 3, the cell 19 will not receive any illumination from the light entering the sensing device. However, as this angular deviation of the light increases to a magnitude of several arc minutes, in the same direction, the cell 19 of the cell group including the cells 17, 18, 19, 20 will begin to intercept the incident light. The light which was impinging only on cell 32 of the cell group including the cells 29, 30, 31, 32 will now also impinge on cell 19 of the cell group including the cells 17, 18, 19, 20. Cell 19 will thus contribute to the output of the X-axis channel as shown in the circuitry of FIGURE 4, with FIGURE 4 indicating the circuitry interconnecting the X-axis responsive cells 17 and 19, and 30 and 32.

Figure 5:
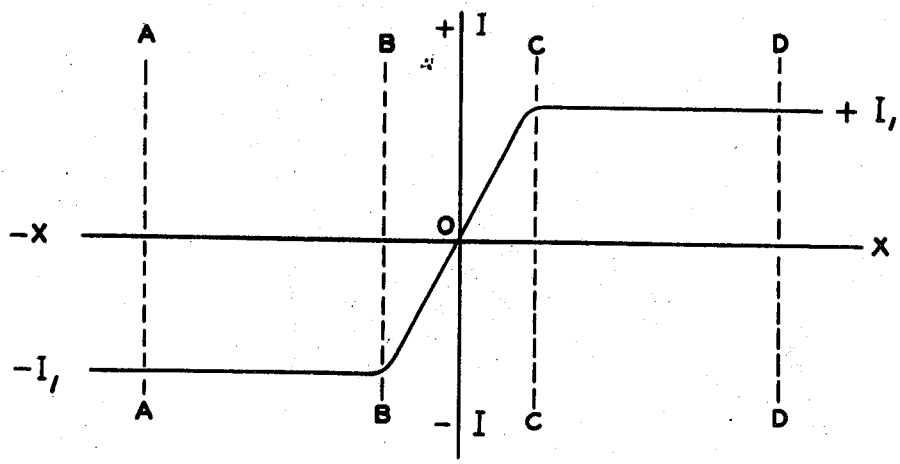
FIGURE 5 is a graphical representation of the output of the circuitry shown in FIGURE 4, as this output varies with the deviation of the light source from the longitudinal axis of the sensing device embodied in the present invention.

The maximum output of the X axis channel shown in FIGURE 4 will occur at a deviation of approximately ten arc minutes when all of the light entering the sensing device converges on cell 19. For a deviation of the light from the Z—Z axis in a negative direction along the X—X axis, the maximum output will occur when all of the light converges on cell 17. Further deviation of the light source in the X–Z plane will, up to a wide angle deviation of plus or minus ten degrees for example, merely produce a constant output at the output pins 38 and 39 of the X axis channel shown in FIGURE 4. When the light beam has moved across the cell 19 until it reaches the other side thereof, thus transversing the ten degree scope of the sensor, it will pass off of the outer edge of the cell 19, thus reducing the output of the X axis channel at the output pins 38 and 39 to zero. The variation of the output of the circuitry of FIGURE 4 with the angular deviation of the light source from the Z—Z axis of the sensing device is shown in FIGURE 5. A similar analysis may be made for the conditions existing when the light entering the sensing device through the lens 12 deviates from the axis Z—Z in the Y direction. In this case, an output of the Y axis channel shown in FIGURE 4 at the output pins 40 and 41 thereof will be generated depending upon the direction of deviation of the entering light beam from the axis Z—Z in the Y direction.

As heretofore described, for a deviation of the light beam in the X direction, the output of the X axis channel is taken across output pins 38 and 39 shown in FIGURE 4. The pins 38 and 39 may be connected to a device such as a control sensor 72 which will control the attitude of an object such as the space vehicle 11, shown in FIGURE 1, in the X direction. The X axis channel is formed by the cells 17 and 19 and the cells 30 and 32 connected in parallel relationship. Corresponding cells included in the same cell group, such as the cells 17 and 19, are connected in reverse polarity so as to indicate a positive and negative direction of deviation along the X axis of the light source from the Z—Z axis shown in FIGURES 1, 2, and 3.

In a similar manner, the output of the Y axis channel, as taken across output pins 40 and 41, will indicate the deviation of the light source from the axis Z—Z in the Y direction. The output pins 40 and 41 may be connected to a device such as a control sensor 111, which will control the attitude of an object such as the space vehicle 11, as shown in FIGURE 1, in the Y direction. Corresponding cells, included in the same cell assembly, such as the cells 18 and 20, are connected in reverse polarity so as to indicate a positive and negative direction of deviation along the Y axis of the light source from the Z—Z axis shown in FIGURES 1, 2 and 3.

In further reference to FIGURE 4, the electrical interconnections of the various photovoltaic cells may be seen in detail. The interconnections shown in FIGURE 4 are divided into X axis channel and Y axis channel circuits, with each channel being independent of the other. The X axis channel circuitry includes those photovoltaic cells, such as the cells 17–19 and 30–32 which will respond to deviation of the light source from the axis Z—Z in a direction along the X axis as shown in FIGURE 3. Similarly, the photovoltaic cells included in the Y axis channel circuitry are those cells such as the cells 18–20 and 31–29 which will respond to deviation of the light beam from the Z—Z axis in a direction along the Y axis as shown in FIGURE 3.

In reference to the X axis channel circuitry shown in FIGURE 4, the photovoltaic cell 17 has a positive terminal connected to a conductor 50 and a negative terminal connected to a conductor 52. The photovoltaic cell 30 has positive and negative terminals connected to the conductors 50 and 52, at points 54 and 56, through conductors 58 and 60 respectively. The cells 17 and 30 respond to a deviation of the light source from the axis Z—Z in a postive direction along the X axis as shown in FIGURE 3. Similarly, the cell 32 has a negative terminal connected to the conductor 50 at a point 62 through a conductor 63, and a positive terminal connected to the conductor 52 at a point 64 through a conductor 65. The negative terminal of the cell 19 joins the conductor 50 at a point 66 through the conductor 67, and the positive terminal thereof joins the conductor 52 at a point 68 through a conductor 69. The cells 19 and 32 respond to a deviation of the light source from the axis Z—Z in a negative direction along the X axis as shown in FIGURE 3. The pin 38 connected to the conductor 50 at the point 66, and the pin 39 connected to the conductor 52 at the point 68 are coupled to input terminals 70 and 71 of the control sensor 72 through conductors 73 and 74 respectively. The control sensor 72 has an output conductor 75 and a grounded output conductor 76, and may further be coupled to a navigational system of the space vehicle 11 shown in FIGURE 1 in order to control the attitude of the space vehicle 11 in the X direction relative to the light source.

In reference to the Y axis channel circuitry, the photovoltaic cell 20 has a positive terminal connected to a conductor 84 and a negative terminal connected to a conductor 86. A corresponding Y axis responsive cell 31 has a positive terminal connected to the conductor 84, at a point 88, through a conductor 90, and a negative terminal connected to the conductor 86, at a point 92, through a conductor 94. In a similar manner, the negative terminal of the Y axis responsive cell 29 is connected to the conductor 84, at a point 96, through a conductor 98, and the positive terminal of the cell 29 is joined to the conductor 86, at a point 100, through a conductor 102. The negative terminal of the corresponding Y axis responsive cell 18 is connected to the conductor 84, at a point 104, through a conductor 105 and the positive terminal thereof is connected to the conductor 86 at a point 106 through the conductor 107. The pin 40 connected to the conductor 84 at the point 104 and the pin 41 connected to the conductor 86 at the point 106 are connected to input terminals 108 and 110 of the control sensor 111 through conductors 112 and 113 respectively. The control sensor 111 has an output conductor 114 and a grounded output conductor 115, and may further be coupled to a navigational system of the space vehicle 11 shown in FIGURE 1 in order to control the attitude of the space vehicle 11 in the Y direction relative to the light source.

The variation of the output of either the X axis channel circuitry or the Y axis channel circuitry with the angular deviation of the light source from the axis Z—Z, as shown in FIGURES 3 and 4, may be best illustrated by referring to FIGURE 5. FIGURE 5 illustrates this variation by graphically representing the relation between the current taken at the output conductor 73–74 of the X axis channel circuitry shown in FIGURE 4, and the deviation of the light source from the sensor axis Z—Z. This relation is plotted on rectangular coordinates with the abscissas thereof representing the aforenoted angular deviation of the light source from the sensor axis Z—Z and the corresponding ordinates representing the output conductors 73–74 of the X axis channel circuitry as shown in FIGURE 4. Although, for purposes of illustration, the variation between the current output and light source deviation has been taken for the X axis channel circuitry, a similar analysis could be made for the Y axis channel circuitry shown in FIGURE 4.

In reference then to FIGURE 5, the line A—A represents a relatively wide angle of deviation of the light source from the axis Z—Z shown in FIGURE 3 by arrow 23A with this deviation having a magnitude in the nature of ten degrees and being in the negative direction along the X axis. The line B—B represents a relatively small angle of deviation, having a magnitude in the nature of ten arc minutes and in the same negative direction along the X axis. Similarly, the line D—D represents a ten degree angle of deviation of the light source from the axis Z—Z as shown in FIGURE 3, with this deviation being in a positive direction along the X axis. The line C—C represents a corresponding ten arc minute angle of deviation in the same positive direction along the X axis.

For a deviation in the nature of ten degrees of the light source in a negative direction along the X axis, as shown by the line A—A, all of the light will be intercepted by the photovoltaic cell 17 shown in FIGURE 3. The output of the X axis channel circuitry shown in FIGURE 4 will remain constant, having a magnitude of $-I_1$, as long as the angle of deviation is large enough so that all of the light will illuminate the cell 17 and not pass through the hole 21 shown in FIGURE 3. This constant current relationship for the light source impinging upon the cell 17 is represented by the position of the curve of FIGURE 5 between the lines A—A and B—B.

As the angle of deviation reaches a relatively small value of about ten minutes, such as that shown by the line B—B in FIGURE 5, the cell 17 will no longer intercept all of the light from the light source with some of this light passing through the hole 21 and impinging upon the photovoltaic cell 30, as described with reference to FIGURE 3. The current output resulting from such a condition varies linearly with the deviation angle, as shown in the portion of the curve of FIGURE 5 between the line B—B and the I—I axis. Under these conditions, cell 17 and cell 30 both contribute to the output of the X-channel circuitry shown in FIGURE 4, except for very small angular deviations, in the nature of several arc seconds, when the cell 30 alone provides this output as heretofore noted.

In a similar manner, when the light source deviates from the Z—Z axis in a positive direction along the X axis, as shown by arrow 23B of FIGURE 3, and the deviation is of a relatively small angle, the current output provided by the cell 19 and the cell 32 shown in FIGURE 3, will vary linearly with the angular deviation, as shown by the portion of the curve of FIGURE 5 between the I—I axis and the line C—C. Total illumination of the photovoltaic cell 19, shown in FIGURE 3, provided by a relatively wide angle of deviation of the light source from the axis Z—Z, thus allowing all of the light to impinge upon the cell 19, will result in a constant current output having the magnitude $+I_1$, as shown in FIGURE 5, with such a condition shown in FIGURE 5 as existing between the lines C—C and D—D.

A current variation is thus shown in FIGURE 5 for a complete excursion of the light source along the X—X axis, ranging from a wide negative angle of deviation of the light source from the axis Z—Z to a relatively wide positive angle of deviation of the light source from the axis Z—Z. Because of the fine angle and wide angle characteristics provided by the light sensing means of the present invention, an angular deviation of the light source as heretofore described may be sensed without a loss in light energy being experienced. Moreover, the electrical outputs corresponding to this deviation are smooth and continuous as illustrated by FIGURE 5, and hence provide an accurate indication of the direction of the light source relative to the axis of the sensing device.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A light sensing device for determining the angle of incidence of light rays from a light source, comprising:
   first light sensitive elements mounted for intercepting light rays above a predetermined relatively small angle of incidence;
   means mounted ahead of the first light sensitive elements for magnifying and focusing light beyond the first light sensitive elements when the light is within the predetermined small angle of incidence;
   second light sensitive elements mounted for intercepting the light focused by the magnifying and focusing means; and
   said first and second light sensitive elements operably connected for providing electrical outputs corresponding to the angle of incidence of the light rays.

2. A light sensing device as described by claim 1, including:
   means mounted intermediate the first and second light sensitive elements for receiving light from the magnifying and focusing means and for magnifying and focusing said received light upon the second light sensitive elements.

3. A light sensing device as described by claim 2 wherein:
   the means mounted ahead of the first light sensitive elements for magnifying and focusing light beyond the first light sensitive elements when the light is within the predetermined relatively small angle of incidence includes a lens having a focal point extending beyond the first light sensitive elements for receiving light rays and for providing a light image at said focal point when the light is within the predetermined small angle of incidence; and
   the means mounted intermediate the first and second light sensitive elements for receiving light from the magnifying and focusing means and for magnifying and focusing said light upon the second light sensitive elements includes another lens for magnifying light from the light image and for providing another light image, and for focusing the other light image upon said second light sensitive elements.

4. A light sensitive device as described by claim 1; wherein:
   the electrical outputs are of a constant magnitude for angles of incidence above the predetermined small angle of incidence and vary linearly with the angle of incidence when said angle is within the predetermined small angle.

5. A light sensing device as described by claim 3, wherein:
   the first mentioned lens focuses light upon the first light sensitive elements when the light is above the predetermined small angle of incidence.

6. A light sensing device as described by claim 3, wherein:
   said first light sensitive elements, said first mentioned lens, said second light sensitive elements and said other lens have a common axis.

7. A light sensing device as described by claim 1, wherein:
   said device is mounted on a space vehicle so that the angle of incidence of the light rays corresponds to the attitude of the vehicle relative to the light source;
   the electrical outputs correspond to the attitude of the space vehicle relative to the light source; and
   the attitude of the space vehicle is controlled in response to said outputs.

8. A light sensing device as described by claim 1, wherein:
   the first light sensitive elements have an aperture located axially thereon; and
   the magnifying and focusing means focuses light through the aperture when the light is within the predetermined small angle of incidence.

9. A light sensing device as described by claim 1, wherein:
   the first and second light sensitive elements are adjustable for providing a null electrical output when the attitude of the light sensing device corresponds to the attitude of the light source.

10. A light sensing device for providing electrical outputs when exposed to a light source and including a casing for mounting the components of the light sensing device, said light sensing device comprising:
    a first lens mounted in said casing for receiving, magnifying and focusing light rays from the light sources;
    first light sensitive elements adjustably mounted in the casing in back of the first lens for receiving and intercepting light rays focused by said first lens within a relative large angle of incidence and having an aperture axially located thereon and operable for passing light rays focused by said first lens within the relatively small angle of incidence;
    a second lens adjustably mounted in the casing in back of the first light sensing elements for receiving, magnifying and focusing said passed light rays;
    second light sensitive elements adjustably mounted in the casing for receiving light rays focused by said second lens;
    said first and second light sensitive elements operably connected to provide electrical outputs corresponding to the attitude of the light source relative to the light sensing device; and
    the first light sensitive elements, the second lens and the second light sensitive elements being adjusted so that when the attitude of the light source coincides with the attitude of the light sensing device light rays will pass through the aperture of the first light sensitive elements and be focused by the second lens on the second light sensing elements so that said second light sensitive elements will provide a null electrical signal.

References Cited

UNITED STATES PATENTS

| | | | |
|---|---|---|---|
| 3,112,399 | 11/1963 | Chew | 250—203 X |
| 3,218,909 | 11/1965 | Fain | 356—4 |
| 3,268,185 | 8/1966 | Eckerman | 250—203 X |

FOREIGN PATENTS 129,509  10/1959  Russia.

JAMES W. LAWRENCE, Primary Examiner

V. LaFRANCHI, Assistant Examiner

U.S. Cl. X.R.

250—209, 220, 237; 318—489; 244—1, 3.21, 77